United States Patent [19]

Scholz

[11] Patent Number: 4,814,119

[45] Date of Patent: Mar. 21, 1989

[54] MANUFACTURE OF HOLLOW ARTICLES

[75] Inventor: Dankmar Scholz, Frankenthal, Fed. Rep. of Germany

[73] Assignee: BASF Aktiengesellschaft, Ludwigshafen, Fed. Rep. of Germany

[21] Appl. No.: 114,012

[22] Filed: Oct. 29, 1987

[30] Foreign Application Priority Data

Oct. 29, 1986 [DE] Fed. Rep. of Germany ....... 3636755

[51] Int. Cl.$^4$ ............................................. B29C 35/08
[52] U.S. Cl. ...................... 264/22; 156/149; 156/273.5; 264/103; 264/236; 264/257; 264/347; 425/174.4
[58] Field of Search ................... 264/22, 25, 236, 347, 264/302, 257, 103; 425/174.4, 174; 156/149, 273.5

[56] References Cited

U.S. PATENT DOCUMENTS

| 2,524,862 | 10/1950 | White | 425/174.4 |
| 2,786,007 | 3/1957 | Chew | 425/174.4 |
| 2,808,623 | 10/1957 | Foster | 264/22 |
| 2,941,934 | 6/1960 | Anspon et al. | 264/22 |
| 2,963,747 | 12/1960 | Brown | 264/22 |
| 3,246,054 | 4/1966 | Guenther et al. | 264/22 |
| 3,317,646 | 5/1967 | Dames, Jr. | 264/347 |
| 4,265,723 | 5/1981 | Hesse et al. | 204/159.23 |
| 4,425,287 | 1/1984 | Hesse et al. | 264/22 |
| 4,575,330 | 3/1986 | Hull | 264/22 |

Primary Examiner—Jeffery Thurlow
Attorney, Agent, or Firm—Keil & Weinkauf

[57] ABSTRACT

The invention relates to a process for the manufacture of hollow articles, in which a photocurable resin is introduced into a mold which transmits light, the mold is irradiated until the resin has polymerized to the desired depth, the remaining resin is allowed to run out and the partially polymerized layer is then fully cured. The hollow articles may be used in particular as expendable cores in the manufacture of plastics containers by the winding process.

3 Claims, No Drawings

MANUFACTURE OF HOLLOW ARTICLES

The present invention relates to a process for the manufacture of hollow articles from photocurable polyester resins, and to their use as an expendable core in the manufacture of plastics containers by the winding process.

The winding process for the manufacture of pipes is known. In this process, fiber rovings or tapes are impregnated with a reactive resin and are wound on a rotating cylindrical pattern or core. When the resin has cured, the pattern or core is removed from the finished pipe. This is not possible in the case of spherical articles, for example spheres, or cylindrical containers with integrally wound bases. In such cases, the patterns used hitherto have consisted of salts, waxes or other materials which have been dissolved out or melted out after the wound stucture has been produced and the resin has been cured. This method is however very expensive, since a new pattern must be produced each time. Another possible way is to produce a thinwalled hollow article from a thermoplastic by blowmolding and use it as an expendable core or liner. However, thermoplastics have the disadvantage that they are dissolved or at least slightly swollen by numerous organic solvents and mostly have relatively poor heat resistance.

It is an objectof the present invention to provide hollow articles of polyester resins, which articles can be manufactured simply and can be used, for example, as an expendable pattern or core in the winding process.

We have found that this object is achieved by the process according to the invention.

Suitable photocurable resins are the conventional polyester resins and vinyl ester resins. Polyester resins are solutions of unsaturated polyesters in copolymerizable monomers, while vinyl ester resins are reaction products of polyepoxides with unsaturated monocarboxylic acids. Both types of resin are described in detail in U.S. Pat. No. 4,265,723, which also contains a description of the preferred acylphosphine oxide photoinitiators. In addition to these, other conventional photoinitiators, such as benzilketals, benzoin ethers and benzoin esters, aromatic disulfides and diacylphosphine oxides, can be employed. The photocurable resins preferably contain from 0.01 to 3% by weight of photoinitiator. In a preferred embodiment, in which the final curing of the partially polymerized layer is effected thermally, the photocurable resin additionally contains free radical initiators, for example peroxides, hydroperoxides, percarbonates, C-C-labile compounds, dialkyl peroxides and diacyl peroxides, preferably in amounts of from 0.05 to 1% by weight. Further, other conventional additives, such as inhibitors, light stabilizers, paraffins, lubricants, transparent colorants, fillers and reinforcing agents, may be present, depending on the end use of the hollow articles.

The liquid resin is introduced into a light-transmitting mold which advantageously is filled completely. The molds may for example consist of glass, glassfiber-reinforced unsaturated polyester resins or thermoplastics, such as polyethylene, polypropylene, polymethyl methcarylate or polycarbonate. It is essential that the materials should tranmit the light with which the irradiation is effected.

The mold is then irradiated from an external source, on all sides and as uniformly as possible. A uniform radiation intensity can be achieved by suitable arrangement of the lamps. In the manufacture of rotationally symmetrical hollow articles, the mold filled with the photocurable resin is allowed to rotate slowly in a curved array of lamps. In the case of asymmetrically shaped articles it is advantageous to allow the array of lamps to rotate about the molding. The basic rule is that the greater the distance from the radiation source to the mold, the more uniform is the irradiation. By masking zones of the mold it is possible to prevent curing from taking place in these zones. In this way, for example, holes or slots can deliberately be provided in the hollow article. The intensity and duration of the irradiation depend on the desired wall thickness of the hollow article; this thickness can vary within wide limits, from 1 mm to 10 cm, though in the manufacture of expendable core wall thicknesses of 1 to 10 mm are preferred. The irradiation time is advantageously from 10 seconds to 10 minutes.

Thereafter, the unpolymerized, still liquid resin is allowed to run out of the mold, which can be achieved by means of a valve mounted in a suitable position on the mold. This resin can be reused to produce a further hollow article.

The partially polymerized layer is then cured by further irradiation or thermally by means of free radical initiators. Preferably, an inert gas is introduced into the hollow article, and this results in a non-tacky inner surface of the article. Possible shrinkage of the curing polyester resin is not detrimental. The hollow article can shrink unrestrictedly inwards during curing, so that virtually stress-free moldings are produced.

Finally, the mold, which is preferably in two or more parts, is removed and the finished hollow article can be taken out.

The hollow articles produced according to the invention may be of any desired shape, for example spheres, cones, pipes or cylinders with closed round ends. They can be used directly as containers, for example bottles, dishes or boxes, as decorative articles, for example vases, as molds for embedding electronic components and especially as expendable cores in the manufacture of hollow plastics articles. In this process, which is known per se, fiber rovings or tapes are impregnated with a plastic and wound on a rotating core. Instead of this winding process, other conventional processes, such as injection molding, compression molding or hand lay-up, may be used. Thereafter the plastic is cured if necessary. Plastics which may be used in this process are, again, polyester resins and vinyl ester resins, and also epoxy resins. However, it is also possible to use thermoplastics, in which case impregnation is effected in a melt or in a solution in a suitable solvent. The impregnated fiber rovings can be wound hot on the core, since the core, being made of a thermoset, remains dimensionally stable even when hot.

Fiber-reinforced hollow articles, such as containers, pipes, pipe bends, pipe branches and pipe T-pieces, can be produced in this manner. The expendable core made from a thermoset acts as an internal protective layer or as a chemical protective layer in pipes and composite cylindrical vessels.

I claim:

1. A process for the manufacture of hollow articles which comprises:
   (a) introducing a photocurable resin into a mold which transmits light;
   (b) irradiating the mold uniformly from all sides, to form a partially polymerized layer;

(c) causing the unpolymerized, liquid resin to run out of the mold;
(d) fully curing the partially polymerized layer, and
(e) separating the mold from the hollow article.

2. The process of claim 1, further comprising surrounding the hollow article separated from the mold with plastic material to form a plastic article, wherein the hollow article separated from the mold is a core in the plastic article.

3. The process of claim 1, further comprising winding a fiber roving impregnated with a reactive resin around the hollow article separated from the mold and curing the resin to produce a second hollow article, wherein the hollow article separated from the mold becomes an internal layer in the second hollow article.

* * * * *